US008804459B2

(12) United States Patent
Steimel

(10) Patent No.: US 8,804,459 B2
(45) Date of Patent: Aug. 12, 2014

(54) METHOD AND APPARATUS FOR PASSIVE DETERMINATION OF TARGET DATA

(75) Inventor: Ulrich Steimel, Oyten (DE)

(73) Assignee: Atlas Elektronik GmbH, Bremen (DE)

( * ) Notice: Subject to any disclaimer, the term of this patent is extended or adjusted under 35 U.S.C. 154(b) by 518 days.

(21) Appl. No.: 13/161,798

(22) Filed: Jun. 16, 2011

(65) Prior Publication Data

US 2011/0310703 A1 Dec. 22, 2011

(30) Foreign Application Priority Data

Jun. 19, 2010 (EP) .................................. 10400031

(51) Int. Cl.
  *G01S 15/66* (2006.01)
  *G01S 3/808* (2006.01)

(52) U.S. Cl.
  CPC ............. *G01S 3/8083* (2013.01); *G01S 3/8086* (2013.01)
  USPC ........................................... 367/99; 367/100

(58) Field of Classification Search
  CPC ........................................................ G01S 15/66
  USPC .................................................... 367/99, 100
  See application file for complete search history.

(56) References Cited

U.S. PATENT DOCUMENTS

| 4,558,439 | A | * | 12/1985 | Gudesen ........................ 367/127 |
| 4,806,936 | A | * | 2/1989 | Williams et al. ............... 342/126 |
| 5,067,096 | A | * | 11/1991 | Olson et al. .................... 102/425 |
| 5,144,595 | A | * | 9/1992 | Graham et al. ................. 367/135 |
| 5,432,753 | A | * | 7/1995 | Maranda ........................ 367/124 |
| 5,471,433 | A | * | 11/1995 | Hammell et al. ............... 367/118 |
| 5,506,817 | A | * | 4/1996 | O'Brien, Jr. .................... 367/135 |
| 5,537,368 | A | * | 7/1996 | O'Brien, Jr. et al. ........... 367/135 |
| 5,675,720 | A | * | 10/1997 | Sato et al. ...................... 345/419 |
| 5,732,043 | A | * | 3/1998 | Nguyen et al. ................. 367/127 |
| 5,877,998 | A | * | 3/1999 | Aidala et al. ................... 367/124 |
| 5,999,117 | A | * | 12/1999 | Engel ............................... 342/95 |
| 6,115,700 | A | * | 9/2000 | Ferkinhoff et al. .............. 706/13 |
| 6,133,867 | A | * | 10/2000 | Eberwine et al. ............... 342/29 |
| 6,198,693 | B1 | * | 3/2001 | Marash ........................... 367/125 |

(Continued)

FOREIGN PATENT DOCUMENTS

AU 2008243476 B2 11/2008
DE 3446658 A1 11/1988

(Continued)

*Primary Examiner* — Isam Alsomiri
*Assistant Examiner* — Hovhannes Baghdasaryan
(74) *Attorney, Agent, or Firm* — Fitch, Even, Tabin & Flannery, LLP

(57) ABSTRACT

A method and apparatus for passive determination of target data (R, K, V) associated with a target from measured and estimated bearing angles. The measured bearing angles (4) are determined by a sonar receiving installation (2) by directionally selective reception of sound waves which are emitted or sent from a target, and the estimated bearing angles are determined from estimated positions of the target. The bearing angle differences from estimated and measured bearing angles are minimized iteratively over a plurality of processing cycles, and a position of the target, on which the minimum is based, is determined as the optimized solution (12). Furthermore, limit values (10) are defined for the target data (R, K, V) to be determined, in order to exclude unrealistic target data as solutions. However, because the optimized solution (12) from the optimization method (6) does not converge with the actual solution if the limit values (10) are chosen erroneously, an error handling process (14) for identification and correction of incorrect limit values (10) is carried out.

16 Claims, 4 Drawing Sheets

(56) References Cited

U.S. PATENT DOCUMENTS

| | | | |
|---|---|---|---|
| 6,260,759 B1 * | 7/2001 | Nguyen et al. | 235/411 |
| 6,532,191 B2 * | 3/2003 | LaRosa et al. | 367/124 |
| 6,631,211 B1 * | 10/2003 | Schermer et al. | 382/225 |
| 6,668,218 B1 * | 12/2003 | Bulow et al. | 701/21 |
| 7,020,046 B1 * | 3/2006 | Baylog et al. | 367/124 |
| 7,577,544 B2 * | 8/2009 | Czipott et al. | 702/150 |
| 7,720,993 B2 * | 5/2010 | Liu et al. | 709/238 |
| RE42,546 E * | 7/2011 | Bulow et al. | 701/21 |
| 7,983,941 B2 * | 7/2011 | Munro et al. | 705/7.12 |
| 2004/0090864 A1 * | 5/2004 | Larosa et al. | 367/124 |
| 2008/0034871 A1 * | 2/2008 | Steimel | 73/584 |
| 2011/0103190 A1 | 5/2011 | Steiner et al. | |

FOREIGN PATENT DOCUMENTS

| | | |
|---|---|---|
| DE | 102007019444 B3 | 4/2008 |
| EP | 1531339 A2 | 5/2005 |
| WO | 2009156337 A1 | 12/2009 |

* cited by examiner

METHOD AND APPARATUS FOR PASSIVE DETERMINATION OF TARGET DATA

CROSS-REFERENCE TO RELATED APPLICATION

The present application claims the priority of European patent Application No. 10400031.0, filed Jun. 19, 2010, the subject matter of which, in its entirety, is incorporated herein by reference.

BACKGROUND OF THE INVENTION

The invention relates to a method for passive determination of target data associated with a target from measured and estimated bearing angles of the type mentioned in the pre-characterizing clause of claim 1, to an apparatus for carrying out the method according to claim 10, and to a computer program which has suitable program code means for carrying out the method.

In order to determine the range, velocity and course of a target, for example of a surface vessel, a submarine or of a torpedo, as target data associated with the target from a carrier vehicle, for example a surface vessel or a submarine, without giving itself away, a sonar receiving installation is used to receive sound waves of the target noise, and to measure bearing angles to the target. These bearing angles are used to estimate a position of the target as a function of the carrier vehicle's own position, and to calculate an associated estimated bearing angle. This is dependent on the target moving uniformly, that is to say on a constant course without acceleration.

DE 34 46 658 C2 discloses a method which iteratively reduces the difference between measured and estimated bearing angles over a plurality of processing cycles, until an error limit is undershot. When this error limit is undershot, the estimated position on which this is based is identified as the target position. The target data associated with this target position is therefore optimized on the basis of a predetermined optimization criterion, depending on the iteration method that is used. These include an optimized solution, which is updated with every new bearing angle measurement during each processing cycle. In uniform conditions, in particular without any target manoeuvre or change in the sound propagation, the optimized solution will evermore closely approach the actual solution as the observation time increases, because the solution which is in each case defined as the best solution, that is to say the optimized solution, converges with the actually correct solution at an earlier or later stage depending on the optimization method that is used and the current scenario.

One such method, which is also referred to as target motion analysis (TMA), has the disadvantage, however, that the calculated solution may be unrealistic because of unknown disturbances in the received signals. If the input data is received with major errors, the TMA method sometimes estimates unrealistic or illogical target data, such as a velocity of 80 knots or a departing course, even though the target is on an approaching course.

WO 2009/156337 A1 discloses a method in which the reliability of the optimized solution is indicated in addition to this solution. For this purpose, a multiplicity of different target tracks and a quality measure for each of these assumed target tracks are calculated during each processing cycle. The reliability of the optimized solution can be deduced from the distribution of the quality measure.

A further method is disclosed in DE 10 2007 019 444 B3, in which bearing angle measurements from a second transducer arrangement, which is arranged at a distance from a first transducer arrangement, are used for estimation of the target data when a parallax value, which is determined between the bearing angle measurements from the two transducer arrangements, is greater than a predeterminable parallax limit value and the range estimated for the target data estimate is less than a comparison range determined from the parallax limit value.

EP 1 531 339 A2 describes a method in which limit values are predetermined for the target data, thus resulting in the iterative estimation process producing only physically and technically sensible target data. Completely unrealistic or illogical results, such as a range of 1000 kilometers, which can invariably occur in the iteration process when the received signals are subject to heavy noise, are excluded from the start.

An optimization method such as this, in which limit values are taken into account for the target data during the optimization process, is referred to as constraint TMA (CTMA). By way of example, the limit values are entered manually by an operator or else are determined from geographic characteristics. Even coarse presets make it possible to exclude estimates of target positions which could not possibly be detected by the sonar receiving installation.

However, the known CTMA method has the disadvantage that its optimized solution cannot converge with the actually correct solution if the limit values are chosen incorrectly. Since the CTMA solution corresponds to the global minimum of an optimization criterion within the defined limit values, this does not produce the actually correct solution when the actual solution is outside the solution space defined by the limit values. After a convergence phase, the simple TMA method would therefore produce more accurate results than the CTMA method if the limit values had been chosen incorrectly.

The invention is therefore based on the problem of identifying and correcting incorrectly chosen limit values when using an optimization method for determination of target data.

SUMMARY OF THE INVENTION

The invention solves the above problem according to a first aspect of the invention by a method for passive determination of target data associated with a target, in particular of a target range (R), a target course (K) and/or a target velocity (V), from bearing angles, which are measured by an arrangement of water-borne sound sensors of a sonar receiving installation by directionally selective reception of sound waves emitted or sent from the target, and from estimated bearing angles, which are determined from estimated positions of the target, with bearing angle differences from the measured bearing angles and the estimated bearing angles being iteratively minimized over a plurality of processing cycles by at least one optimization method, referred to in the following text as a CTMA method, and with an estimated position of the target, on which the minimum is based, being determined as an optimized CTMA solution, from the temporary target data (R, K, V), and with the CTMA method taking account of predetermined limit values for the target data (R, K, V) to be determined, during the optimization process; and wherein:
  an error handling process is carried out for identification and correction of incorrect limit values, which process has the following steps:
   a) limit values are checked for possible errors by a plausibility test module carrying out a plausibility test for identification of incorrect limit values and
   b) i) if at least one incorrect limit value (10) is identified: one, a plurality or all of the limit values (10) are changed using predetermined rules by means of a correction module (40), and the CTMA method (6) and the error handling process (14) are carried out again, taking account of the changed limit values (20) for determination of new temporary target data (R, K, V) and ii) if no incorrect limit value (10) is identified: the optimized CTMA solution (12) from the CTMA method (6) is output, and/or the target data (R, K, V) which has been determined from the CTMA solution (12) and is assumed to be correct is output.

The invention solves the above problem according to a second aspect of the invention by an apparatus for passive determination of target data (R, K, V) associated with a target, in particular of a target range (R), a target course (K) and/or a target velocity (V), from bearing angles, which can be measured by an arrangement of water-borne sound sensors of a sonar receiving installation by directionally selective reception of sound waves emitted or sent from the target, and from estimatable bearing angles, which can be determined from estimated positions of the target, with bearing angle differences from the measured bearing angles and the estimated bearing angles being iteratively minimized over a plurality of processing cycles by at least one optimization method, referred to in the following text as a CTMA method, and with an estimated position of the target, on which the minimum is based, can be determined as an optimized CTMA solution, from the temporary target data (R, K, V), and with the CTMA method can be taken into account of predetermined limit values for the target data (R, K, V) to be determined, during the optimization process, in particular for carrying out a method according to the invention; comprising:

an error handling device that is designed to identify and to correct incorrect limit values, with the error handling device having a plausibility test module and a correction module, the plausibility test module, which is designed to identify incorrect limit values, the correction module, which is designed to correct incorrect limit values, and an output unit for outputting the optimized CTMA solution from the CTMA method and/or for outputting the target data (R, K, V) which can be determined from the CTMA solution and is assumed to be correct, for the situation in which no incorrect limit values can be identified by the plausibility test module.

Receiving signals from at least one electro-acoustic and/or opto-acoustic transducer arrangement, for example a horseshoe base or a flank antenna onboard a submarine as a carrier vehicle and/or a towed antenna, which is towed by a surface vessel or a submarine, are combined in a sonar receiving installation on a directionally selective basis to form array signals, and the levels of the array signals are observed. Any increase in the level indicates that there is a target on a bearing ray of a bearing angle associated with the array signal.

While the carrier vehicle is moving on its own leg along its course, bearing angles are measured continuously. The own leg in this case denotes that path on which the carrier vehicle has travelled with a constant course during a predetermined time period. The bearing angles measured to the target are processed in successive processing cycles to form target data. In this case, at least one target data item, but in particular a set of target data items, is or are estimated in each processing cycle, for example the target range, target course and/or target velocity.

The CTMA method is preferably used as the optimization method, and this takes account of previously defined limit values for determination of the target data. This is a non-recursive calculation method, in which bearing angle differences are formed from the measured and the estimated bearing angles. The sum of these bearing angle differences, which are weighted in some way, or the squares of these differences, is or are then iteratively minimized. When a predetermined error limit is reached, that is to say a predetermined minimum value of the bearing angle difference, the optimized solution is indicated as the best solution by means of vector components X0, Y0, VX, VY. The current target data for a target range, a target course and/or a target velocity can be determined from the position components X0, Y0 and the velocity components VX, VY. However, the invention is not restricted to the CTMA method. Other optimization methods are also feasible, which calculate positions for the target from estimated X-Y components, and take account of limit values for the target data during the optimization process.

In order to make it possible to exclude from the start unrealistic or illogical target data, which can result for example because of very noisy received signals, the solution space of the CTMA method is sensibly restricted for the estimated target data by defining limit values for the target data. In this case, each target data item is in each case assigned a maximum and a minimum limit value. For example, limit values for a minimum and a maximum possible target range, an approaching or departing course, and values for a minimum and a maximum possible target velocity are defined for a target range, a target course and a target velocity. These values are dependent on the technical specifications of the sonar installation and of the target. For example, the limit value for the maximum range is the maximum range of the sonar receiving installation, and the limit value for the maximum velocity is, for example, the maximum velocity of high-speed boats or torpedoes.

An operator can enter these limit values for the target data manually, or else the limit values can be determined from the assumed range of the sensor that produces the bearing angles, or the geographic characteristics. Constraints for position components and velocity components are determined from these predetermined limit values, and are then used as the basis for estimation of the position of the target. In consequence, only physically and technically sensible data relating to the range of the target, its velocity and its course is introduced into the iterative estimation process.

However, it is possible to have incorrectly chosen the limit values in advance. For example, it is frequently assumed for the course of a target that the target is on an approaching course when it is first detected. However, a target may, for example, be on a departing course behind an island. When this target now emerges from the island shadow, it is moving away when it is first detected. This leads to the optimized solution from the CTMA method never being able to converge with the actually correct solution on the basis of previously defined limit values, because the solution space is correspondingly restricted by the limit values.

According to the invention, an error handling process is advantageously carried out for identification and correction of incorrect limit values. The error handling process first of all includes a plausibility test for identification of incorrect limit values. Then, either the correctly assumed target data is determined from the optimized solution of the CTMA method in the situation in which there is no incorrect limit value, or else, one, a plurality or all of the limit values are changed using predetermined rules by means of a correction module, and the CTMA method and the error handling process are carried out again, taking account of the previously changed limit values for determination of new temporary target data for the situation in which there is at least one incorrect limit value. The advantage of the method according to the invention is that incorrectly chosen limit values can be identified and corrected by means of the error handling process.

In one preferred embodiment of the invention, the method has additional steps. A further optimization method, referred to in the following text as a TMA method, is used to determine an optimized TMA solution, from which further temporary target data is determined for a target range, a target course and/or a target velocity. In this case, the estimated position of the target, which is used as the basis for the minimum determined by the TMA method, is determined as the optimized TMA solution. A check is then carried out to determine whether the temporary target data is within a solution space which is covered by the limit values. For this purpose, the determined temporary target data is compared with previously defined limit values. In this case, the limit values may have been entered manually by an operator, or may have been determined from the geographic characteristics.

The invention has identified that, as soon as the TMA method has determined a solution which is within the solution space covered by the predetermined limit values, this TMA solution corresponds to the CTMA solution. However, the CTMA method requires more computation power than the TMA method. It is therefore particularly advantageous to first of all compare the TMA solution with the limit values, or with a variable which is derived from the limit values, in order to determine whether it is necessary to carry out the CTMA method.

In order to check whether the TMA solution or the temporary target data is within a solution space which is covered by the limit values, the determined temporary target data is compared with the limit values. If no temporary target data item is outside the solution space covered by the limit values, or a variable derived from the limit values, the TMA solution is output and/or the target data which has been determined from the TMA solution and is assumed to be correct target data.

However, if at least one temporary target data item is outside the solution space covered by the limit values, the CTMA method is carried out for estimation of the position of the target, with the CTMA method taking account of previously defined limit values in the estimation process. Furthermore, the error handling process according to the invention for identification and correction of incorrect limit values is carried out.

In a further preferred embodiment of the invention, a convergence time of the TMA method is determined. At the start of the track, the optimization method is in a pre-convergence phase and, after the convergence time, it is in a post-convergence phase. The pre-convergence phase is distinguished in that incorrect input data results in different solutions being determined in each processing cycle, although they have the same probability. For example, the TMA solution thus fluctuates between an approaching and a departing target course until the convergence time is reached, and a stable solution occurs. During this phase, it is difficult to identify incorrectly chosen limit values. The error handling process for identification and correction of incorrect limit values is therefore advantageously carried out only after the convergence time has been reached.

However, the invention has identified that the operator often has additional information about the target. Therefore, in the situation in which the CTMA method is carried out, the solution of the CTMA method and/or the temporary target data which was determined from the CTMA solution is output within the pre-convergence phase, that is to say before the convergence time is reached, without any previous error handling process.

The convergence time is preferably determined by means of a convergence phase detector using a value for a range of confidence (ROC) of the TMA method. This value is calculated from the previous estimates from the previous processing cycles of the TMA method. The ROC value is preferably determined from the standard deviation of the target range, taking account of the estimated target position and the own position. This ROC value is then compared with a predetermined threshold value. If the ROC value reaches this threshold value, the convergence phase detector defines the convergence time. A high ROC value at the start of a track indicates an unstable solution. After a number of processing cycles of the TMA method, the solution scarcely changes at all, and a low ROC value initiates the post-convergence phase.

According to a further embodiment of the invention, it is particularly advantageous to visually output the CTMA solution to the operator, together with the previously defined limit values, until the convergence time is reached. In order to allow use of the additional information which the operator possibly has about the target, the CTMA solution is preprocessed in graphic form such that the operator can tell whether the solution is a result of incorrectly chosen limit values. For example, the output can be produced in numerical form, in which the critical values are marked in colour, for example, in a table. A graphic output, in particular a plan position indicator (PPI) plot of the target data, is likewise feasible, in which the limit values are also displayed. In this case, it is particularly advantageous to be able to change incorrect limit values manually by means of an input device, within a processing cycle, as well.

In a further embodiment of the invention, a residue test and/or an edge test are/is carried out for the plausibility test for identification of incorrect limit values. The CTMA method produces a solution which is within the predetermined limit values. This is that solution which corresponds to the global minimum within the solution space covered by the limit values. If the CTMA solution does not match the actual target data, because the limit values were chosen incorrectly, this can advantageously be determined by means of the residue test and/or the edge test.

According to a further advantageous embodiment of the invention, a residue factor is determined for the residue test. Using at least two optimization methods, in particular the TMA method and the CTMA method, the residue factor is determined from the respective solutions of the optimization methods. This is calculated from the sum of the—advantageously weighted—squares of the differences for the estimated bearing angles and for the associated measured bearing angles, and this is then compared with at least one predetermined threshold value. If the residue factor reaches or exceeds the maximum threshold value, the plausibility test identifies an incorrect limit value. Furthermore, the plausibility test identifies an incorrect limit value if further predetermined threshold values, preferably lower than the first threshold value, are reached or exceeded in a plurality of successive processing cycles of the optimization method.

According to a further advantageous embodiment of the invention, the limit values and/or a variable which is derived from the limit values, in particular state limit values, are/is compared with the CTMA solution for the edge test. The limit values for the target range, the target course and the target velocity are each defined as a minimum value and a maximum value, and are converted within state limit values to a state vector $p=[X0, Y0, VX, VY]$. In this case, $X0, Y0$ denote the target position at the start of the track, and $VX, VY$ denote the velocity components of the target.

These state limit values can in turn be converted back to real effective limit values for the target range, target course and target velocity, in which case the real effective limit values are normally weaker than the defined or entered limit values.

Both the limit values and the state limit values derived from them are compared with the solution of at least one optimization method during the edge test, in order to determine whether the target data of the solution is within this solution space covered by the limit values, or on its "edge". The test of limit values and state limit values derived from them advantageously improves the reliability of this edge test method.

Furthermore, not only the current solutions of the optimization method but likewise solutions from previous processing cycles are taken into account for the edge test.

In a further embodiment of the invention, in order to correct incorrect limit values by means of the correction module, when either at least one incorrect limit value or at least one already changed, incorrect limit value is identified, one, a plurality or all of the limit values is or are changed and/or at least one associated limit value interval, which has the limit value, is changed, and the CTMA method and the error handling process are carried out once again in the current processing cycle, taking account of the changed limit values. This is repeated in each case when at least one incorrect, changed limit value is identified again more than once in the current processing cycle. A numerical variable is preferably used for this purpose, which determines the number of successive runs of the CTMA method and of the error handling process. If the numerical variable reaches a predetermined threshold value, the CTMA method and the error handling process are carried out in the current processing cycle with predetermined minimum limit values. Alternatively, the method for determination of target data is started with the next bearing angle measurement in a new processing cycle.

The previously determined residue factor is preferably used to decide whether the method for determination of target data is started in a new processing cycle or the error handling process is carried out in the current processing cycle with minimum limit values. If the residue factor exceeds a previously defined threshold value, this is an indication of highly incorrectly chosen limit values, and the error handling process is carried out once again taking account of the minimum limit values in the current processing cycle. If the residue factor is low, the method for determination of target data is, however, started in a new processing cycle, with the next bearing angle measurement.

In a further embodiment of the invention, any target manoeuvre while carrying out the optimization method, in particular the CTMA method, is taken into account. A target manoeuvre time is determined for this purpose, at which the optimization method starts with the calculation of a new target leg. A leg in this case denotes a path or a stage, which is travelled on with a constant course at a constant velocity for a predetermined time period.

The optimization method uses the originally defined limit values for calculation of the original target leg, and new limit values are defined for calculation of the new target leg. This advantageously results in course and/or velocity changes of the target being taken into account in the calculation of the optimization method. In particular, an estimated final position of the original target leg is also used in order to derive therefrom limit values for a range for the start of the new target leg.

An alternative embodiment of the invention relates to a computer program, in particular to a computer program product, which has program code means for carrying out the method according to the invention when the program is run on a computer or a corresponding computation unit. The program code means can be stored on data storage media which can be read by a computer, in which case suitable data storage media may be, for example, floppy disks, hard disks, flash memory, EPROMs, CDs, DVDs etc. It is also possible to download a program via computer networks, in particular the Internet, Intranet, etc.

Further advantageous embodiments of the invention result from the dependent claims and from exemplary embodiments which will be explained in more detail with reference to the attached drawing.

DETAILED DESCRIPTION OF THE INVENTION

When a water craft is preferably moving at a constant velocity along its own leg, bearing angles to a target are measured from this water craft while the target is assumed to be moving with a constant velocity and on a constant course from a first target position to a second target position.

The bearing angles are determined in successive processing cycles as a function of the own position of the water craft. A position of the target is estimated from these bearing angles, and an associated estimated bearing angle is calculated. An optimization method is used to iteratively reduce the sum of the squares of the differences between the measured and estimated bearing angles over a plurality of processing cycles, until a predetermined error limit is undershot. An optimized solution of the optimization method is determined from the estimated position of the target on which the minimum is based. Target data, in particular a target range R, a target course K and/or a target velocity V, is determined from this optimized solution during each processing cycle. The method according to the invention for passive determination of target data associated with a target will be explained in more detail with reference to FIG. 1.

Figure 1:
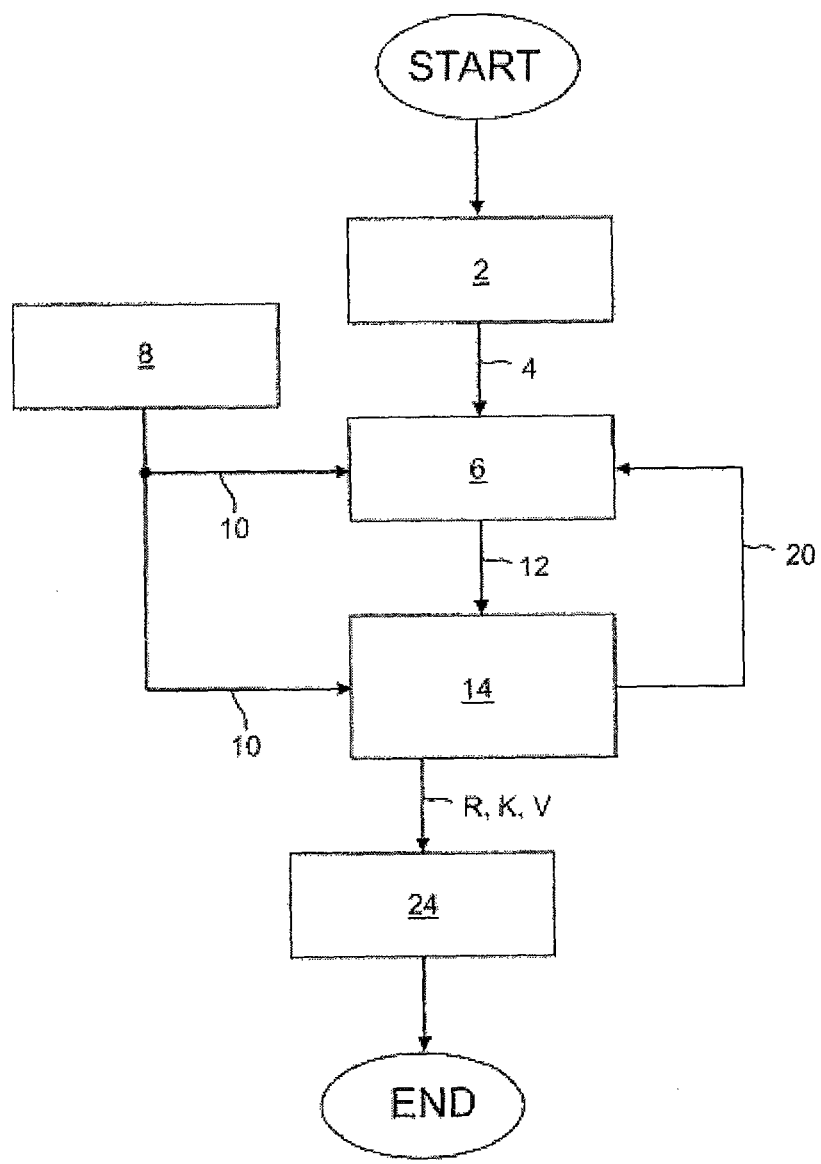
FIG. 1 shows a schematic illustration of the method procedure based on the method according to the invention.

FIG. 1 shows a schematic illustration of the method procedure corresponding to the method according to the invention. A sonar receiving installation 2 is used to measure bearing angles 4 to the target by directionally selective reception of sound waves which are emitted or sent from the target. Temporary target data is calculated in a calculation unit by means of an optimization method 6, referred to in the following text as the CTMA method. Bearing angle differences are formed from estimated bearing angles, which are determined from estimated positions of the target, and measured bearing angles, which are minimized iteratively. This least square error method is, however, only one possible method for determination of the target data; further methods are likewise feasible.

Since further information about the target is normally known, for example that the target is approaching or departing and/or the target velocity is between a lower and an upper limit value, for example between 5 and 20 knots, it is advantageous to provide this information to the CTMA method 6 for determination of the target data.

For this purpose, the method according to the invention has an input device 8 for limit values 10 by means of which, for example, limit values for a minimum and a maximum target range ($inpR_{min}$, $inpR_{max}$), a target course between 0° and 360° ($inpK_{min}$, $inpK_{max}$) and a minimum and a maximum target velocity ($inpV_{min}$, $inpV_{max}$) can be entered manually by an operator, or can be determined from the geographic characteristics. This sensibly restricts the solution space for the target data R, K, V to be determined.

The following explanations relate to an application of the CTMA method, as mentioned initially, as an applied optimization method 6. However, they can also be transferred to other optimization methods which take account of predetermined, defined limit values 10 for estimation of the target data R, K, V to be determined.

Since the limit values 10 can also be entered incorrectly on the input device 8, the CTMA solution 12 from the CTMA method 6 as determined in each processing cycle is passed to an error handling device 14 for identification and correction of incorrectly chosen limit values 10. This error handling device 14, which will be explained in more detail in the following text with reference to FIG. 3, decides whether or not there is at least one incorrect limit value 10.

When at least one incorrect limit value 10 is present, one, a plurality or all of the limit values 10 is or are varied according to predetermined rules within the error handling device 14, and it or they is or are transferred as new limit values 20 to the CTMA method 6. This once again determines a CTMA solution 12 in the current processing cycle.

When no incorrect limit value 10 is present, the target data R, K, V which is assumed to be correct is determined from the CTMA solution 12 and is transferred for data output and/or data processing purposes to an output device 24, in which case the output device 24 may be a display unit, in particular a plotter, a printer or a screen, for visual display of the target data R, K, V to be determined or else a device for providing the target data R, K, V for a possibly downstream signal processing device.

Figure 2:
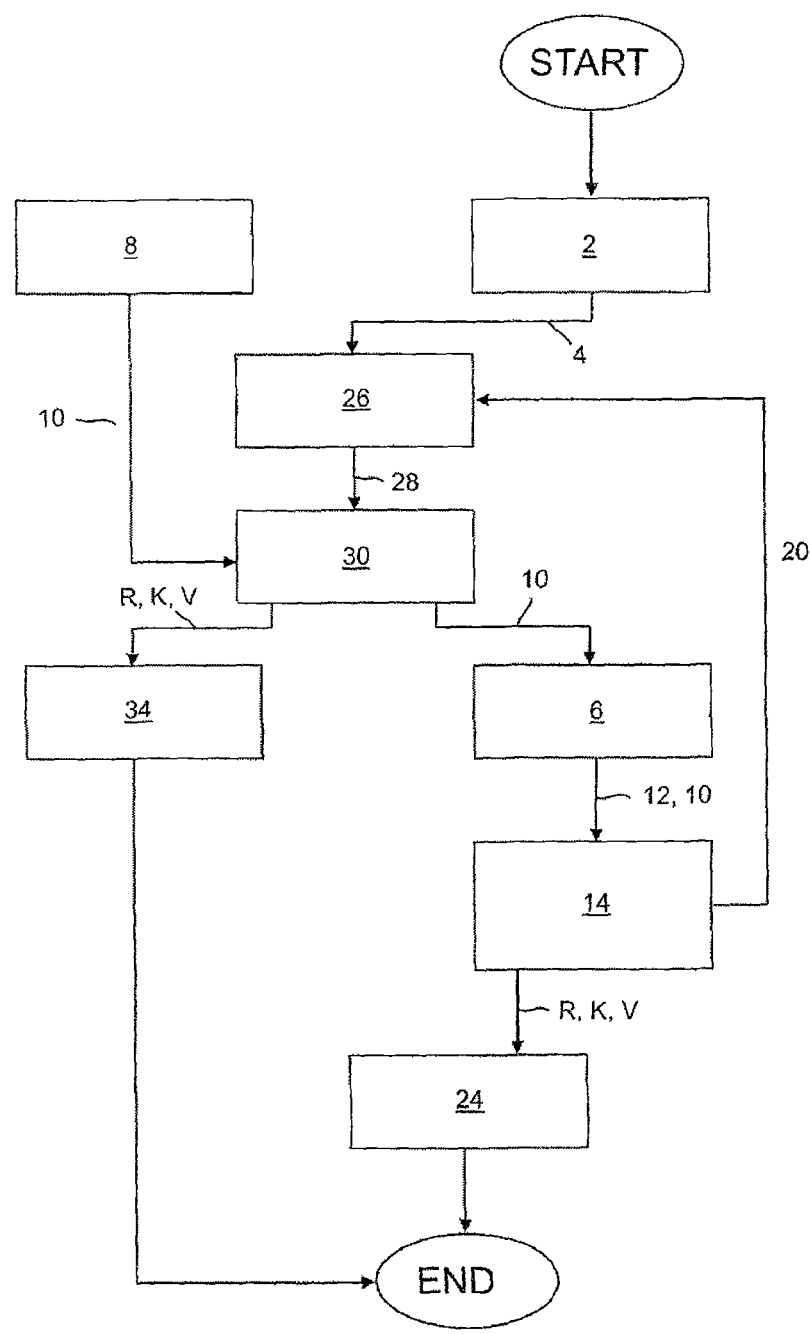
FIG. 2 shows a schematic illustration of the method procedure with additional method components according to one exemplary embodiment of the invention.

FIG. 2 shows a further exemplary embodiment, in which additional method components have been added to the method as described above. The same reference numbers in this case denote the same functional units, as a result of which reference is correspondingly made to the above statements.

According to the exemplary embodiment in FIG. 2, the method for determination of target data has two calculation units for carrying out two separate optimization methods. A first calculation unit preferably contains a simple TMA method 26 for estimation of first temporary target data $R_{TMA}$, $K_{TMA}$, $V_{TMA}$, and a second calculation unit contains the CTMA method 6 for estimation of further temporary target data R, K, V.

If the temporary target data $R_{TMA}$, $K_{TMA}$, $V_{TMA}$ which results from the TMA solution 28 were to be within a solution space which is restricted by the predefined limit values 10, then the TMA solution 28 would correspond to the CTMA solution 12.

In the exemplary embodiment of the invention shown in FIG. 2, the determined TMA solution 28 from the TMA method 26 is first of all transferred to a monitor device 30. The temporary target data $R_{TMA}$, $K_{TMA}$, $V_{TMA}$ determined from the TMA solution 28 is compared in the monitor device 30 with the previously defined limit values 10. If the temporary target data $R_{TMA}$, $K_{TMA}$, $V_{TMA}$ is within the solution space covered by the limit values 10, the TMA solution 28 and/or the temporary target data $R_{TMA}$, $K_{TMA}$, $V_{TMA}$ determined from this TMA solution 28 are/is transferred, for data output and/or data processing, to an output unit 34 as the target data R, K, V which is assumed to be correct. By way of example, the output unit 34 may be a plotter, a screen or the like for visual display of the target data R, K, V. It is also feasible for the target data R, K, V to be made available by means of the output device 34 for further signal processing.

However, if at least one temporary target data item $R_{TMA}$, $K_{TMA}$ and/or $V_{TMA}$ in the TMA solution 28 from the TMA method 26 is outside the solution space bounded by the limit values 10, the CTMA method 6 is carried out in addition to a subsequent error handling process 14, as explained above with reference to FIG. 1.

In the above exemplary embodiment as shown in FIG. 1, in the situation in which the error handling process 14 has identified at least one incorrect limit value 10, the changed limit values 20 are, however, transferred to the CTMA method 6. In the exemplary embodiment shown in FIG. 2, the changed limit values 20 are transferred to the TMA method 26 for the situation in which the error handling process 14 has identified at least one incorrect limit value 10. This has the advantage that, when the limit values 20 have been changed to be correct, the TMA solution 28 and/or the target data R, K, V which has been determined therefrom and is assumed to be correct can be output, and the CTMA method 6 together with the error handling process 14 do not need to be carried out again in the current processing cycle.

Figure 3:
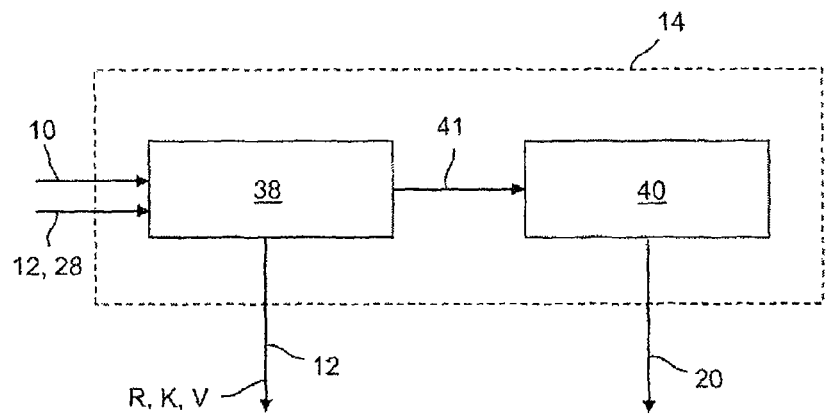
FIG. 3 shows a schematic functional overview of the error handling device according to one exemplary embodiment of the invention.

FIG. 3 shows a functional overview of the error handling device 14 for identification and correction of incorrect limit values 10. The error handling unit 14 contains both the limit values 10 and the solutions from the two optimization methods. In this exemplary embodiment, the TMA solution 28 from the TMA method 26 as well as the CTMA solution 12 from the CTMA method 6 are transferred to the error handling device 14. A plausibility test module 38 checks the limit values 10 for possible errors. The method of operation of the plausibility test module 38 will be explained in more detail in the following text with reference to FIG. 4.

If the plausibility test module 38 does not identify any incorrect limit value 10, the CTMA solution 12 from the CTMA method 6 is output, and/or the target data R, K, V which has been determined from this CTMA solution 12 and is assumed to be correct is output.

For the situation in which at least one incorrect limit value 10 is identified by means of the plausibility test module 38, a corresponding error signal 41 is transferred to a correction module 40, in response to which the correction module 40 changes one, a plurality or all of the limit values 10 according to predetermined rules. The method of operation of the correction module 40 will be explained in more detail in the following text with reference to FIG. 5.

The limit values 20 which have been changed by means of the correction module 40 are output, and are therefore available for the rest of the method procedure.

Figure 4:
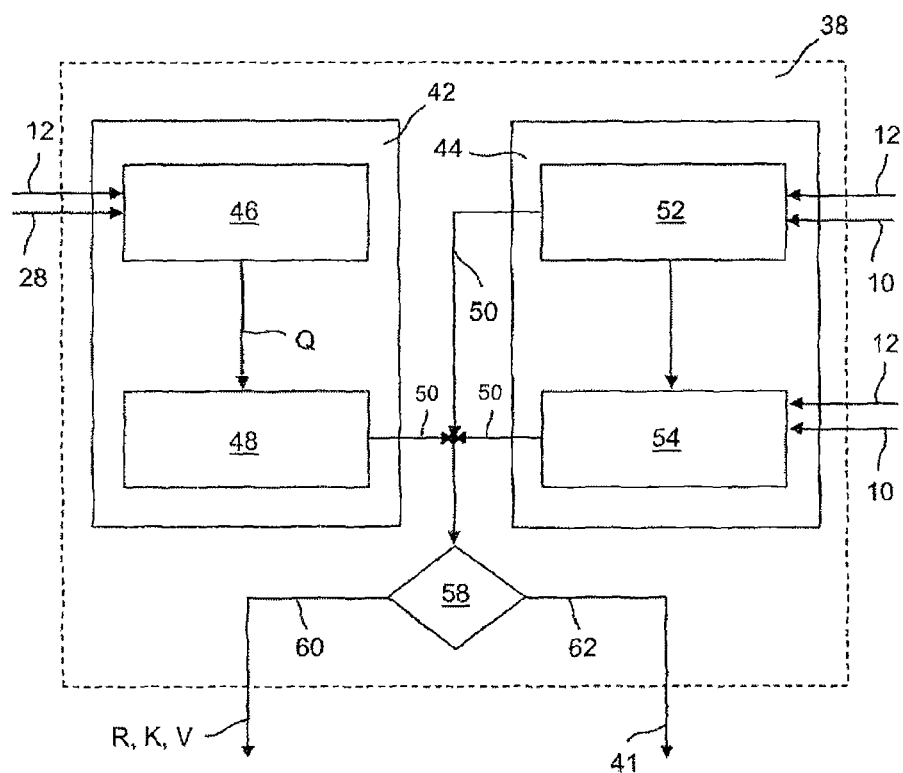
FIG. 4 shows a schematic functional overview of the plausibility test module according to one exemplary embodiment of the invention.

FIG. 4 shows a functional overview of the plausibility test module 38, which has a residue test module 42 and an edge test module 44 for identification of incorrect limit values 10.

The residue test module 42 continuously receives the CTMA solutions 12 from the CTMA method 6, as well as the TMA solutions 28 from the TMA method 26, from which a residue factor Q is determined for each processing cycle by means of a residue factor calculation unit 46. The residue factor Q is determined as the quotient of the sum of the absolute residues:

$$Q = \Sigma |CTMA\text{-residues}| / \Sigma |TMA\text{-residues}|$$

The residue factor Q is then transferred to a comparison unit 48, in which the residue factor Q is compared with at least one predetermined threshold value in each processing cycle. In this case, the comparison unit 48 outputs a positive error signal 50 if the residue factor Q has exceeded a first threshold value, and/or if the residue factor Q has exceeded a second threshold value, which is lower than the first threshold value, in two successive processing cycles, and/or if the residue factor Q has exceeded a third threshold value, which is lower than the second threshold value, in three successive processing cycles. However, the invention is not limited to a comparison with three predetermined threshold values. In fact, any desired combinations of threshold value comparisons and successive processing cycles by means of the comparison unit 48 should be considered to have been disclosed.

Furthermore, the plausibility test module 38 has an edge test module 44 for determination of incorrectly chosen limit values 10. A first edge test 52 checks whether at least one temporary target data item R, K and/or V, which has been determined from the CTMA solution 12, such as the target range, target course and/or target velocity, is on the edge or outside the solution space covered by the limit values 10. This is because this is often the case if the limit values 10 are chosen incorrectly. By way of example, if the true target velocity is 10 knots, the estimated target velocity is indicated to be 8 knots when the velocity limit value is defined to be 2 to 8 knots. In this case, at least one estimated target data item is on the edge of at least one limit value 10, and the first edge test 52 indicates a positive error signal 50.

In order to achieve greater reliability for the determination of incorrectly chosen limit values 10, the temporary target data R, K, V which has been determined from the CTMA solution 12 from the CTMA method 6 is likewise compared with a variable derived from the limit values 10, in particular the state limit values. A second edge test 54 is therefore preferably carried out on the basis of the state vector p=[X0, Y0, VX, VY]. The limit values 10 are first of all converted to state limit values, and then to weaker real effective limit values, in order to compare these with the temporary target data R, K, V which has been determined from the CTMA solution 12. If at least one temporary target data item R, K and/or V is outside or on the edge of the solution space covered by the real effective limit values, the second edge test 54 outputs a positive error signal 50.

Furthermore, in one special embodiment, not only is the temporary target data R, K, V from the current processing cycle compared in the first edge test 52 and/or in the second edge test 54 but the history of the temporary target data R, K, V is also taken into account in the error identification. In order to reduce the probability of the edge test module 44 making an incorrect decision, a positive error signal 50 is therefore output only if the temporary target data R, K, V, which has been determined from the CTMA solution 12, is on the edge of the solution space covered by the limit values 10, or of a variable derived from these limit values 10, in a plurality of successive processing cycles of the CTMA method 6.

The positive error signals 50 from the comparison unit 48, from the first edge test 52 and from the second edge test 54 are collated in a decision block 58. In the situation in which the plausibility test module 38 has not identified any incorrect limit value 10, that is to say no positive error signal 50 has been output in each case by the comparison unit 48, the first edge test 52 or the second edge test 54, the temporary target data R, K, V is output via the branch 60 as the target data R, K, V, which is assumed to be correct, from the CTMA method 6, in order to indicate this to an operator by means of an output unit 24.

For the situation in which, however, the plausibility test module 38 has identified at least one incorrect limit value 10, that is to say the comparison unit 48 and/or the first edge test 52 and/or the second edge test 54 have/has produced a positive error signal 50, an error signal 41 is output via the branch 62 to the correction module 40, for correction of the limit values 10.

Figure 5:
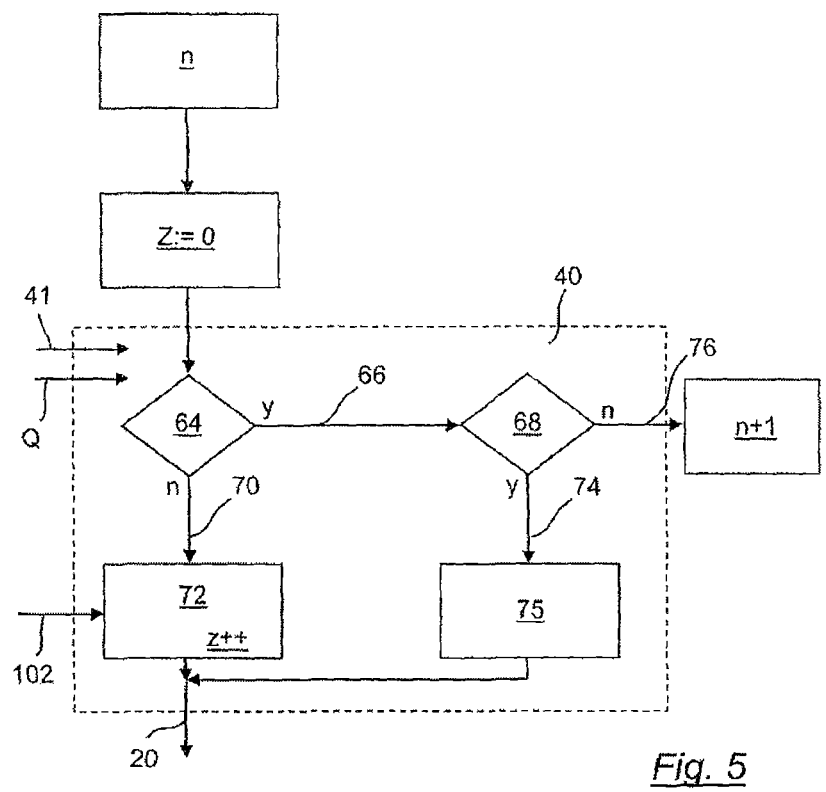
FIG. 5 shows a schematic functional overview of the correction module according to one exemplary embodiment of the invention.

FIG. 5 shows a functional overview of the correction module 40 for correction of incorrect limit values 10. A numerical variable z is initialized in the current processing cycle n for an initial error identification 41 by the plausibility module 38. The numerical variable z is preferably preset to the value 0. A decision block 64 within the correction module 40 checks whether the numerical variable z has reached a predetermined value, for example the value 3.

If the decision block 64 makes a positive decision, that is to say the numerical variable has reached the value 3, a further decision block 68 is operated via a branch 66 and checks whether the residue factor Q determined by the plausibility test module 38 is less than or greater than a predetermined threshold value.

If the decision block 64 makes a negative decision, that is to say the numerical variable z is less than 3, a modification unit 72 is activated via a branch 70 in order to change the limit values 10.

The only limit values 10 which are changed are those whose associated target data item R, K and/or V has been detected by the plausibility module 38 as lying on the edge or outside the solution space covered by the limit value 10. If, for example, the target range R is the only estimated target data item which lies on the edge of a previously defined limit value interval [inpR$_{min}$, inpRmax] for the target range, then only the limit values inpR$_{min}$ and inpR$_{max}$ for the target range are therefore also changed by means of the modification unit 72.

The limit values 10 are changed in small steps within the predetermined minimum limit values, in which case the minimum limit values may be, for example, a target range of inpR$_{min}$=0.1 to inpR$_{max}$=100 kilometers, a target velocity of inpV$_{min}$=0.1 to inpV$_{max}$=15 meters per second and a target course of inpK$_{min}$=0 to inpK$_{max}$=360 degrees. For example, if the estimated target range from the CTMA solution 12 lies on the edge, then the limit value interval for the target range [inpR$_{min}$, inpR$_{max}$] is shifted such that the estimated target range then lies approximately in the centre of the shifted limit value interval.

The changed limit values are then once again supplied as new changed limit values 20 to the CTMA method 6 in the current processing cycle n. In addition, the numerical variable z is incremented by one. The limit values 10 therefore cannot be changed indefinitely often in each processing cycle. For example, if the numerical variable z reaches the value 3, then a change is made to the decision block 68, and the residue factor Q is checked.

If the residue factor Q is greater than a predetermined threshold value, this is possibly an indication of very incorrectly chosen limit values 10. A branch 74 is therefore used to select minimum limit values 75, which are output instead of the changed limit values as new limit values 20 in the current processing cycle n. In contrast to the limit values 10 defined initially, the minimum limit values 75 are particularly weak limit values.

However, if the residue factor Q determined by the plausibility test module 38 is less than the predetermined threshold value, then a change is made via the branch 76 from the decision block 68 to the next processing cycle n+1, and the method according to the invention for determination of target data is started using the next bearing angle measurement.

Figure 6:
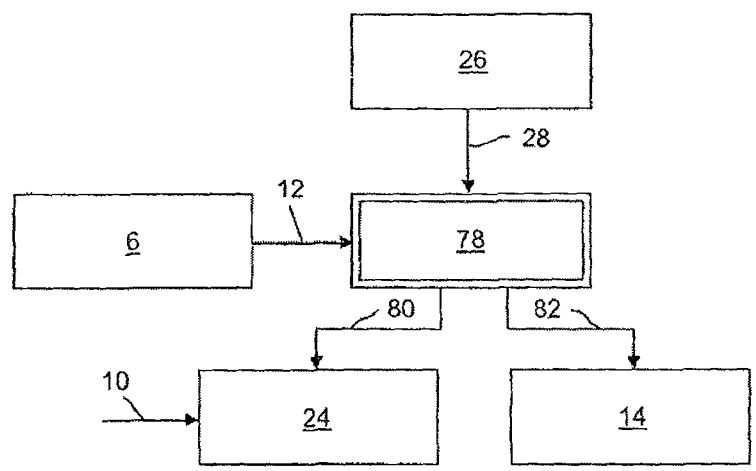
FIG. 6 shows a schematic illustration of an extension to the exemplary embodiment shown in FIG. 2, with a convergence phase detector.

FIG. 6 shows a schematic illustration of an extension to the exemplary embodiment shown in FIG. 2, with a convergence phase detector 78. At the start of a track, the optimization method may produce different solutions, although with equal probability, because of incorrect input data. For example, if the target is at a small orientation angle at the start of the track, the TMA method 26 will in some circumstances initially estimate an incorrect velocity.

Despite correctly chosen limit values 10, the CTMA method 6 will also in some circumstances estimate a velocity which is on the edge of the solution space covered by the limit values 10.

However, when the TMA method 26 reaches its convergence time, sufficient input data will have been gathered to obtain a stable TMA solution 28. After reaching the convergence time, unambiguous results will be obtained by then carrying out an edge test 52, 54. It is therefore advantageous to carry out the error handling process 14 only after reaching the convergence time. The exemplary embodiment described above with reference to FIG. 2 has a convergence phase detector 78 added to it for this purpose, as is illustrated in FIG. 6.

The convergence phase detector 78 receives the TMA solution 28 from the TMA method 26 and, if available, the CTMA solution 12 from the CTMA method 6.

The convergence time of the TMA method 26 is determined by means of a range of confidence (ROC) of the TMA method 26. Until the convergence time is reached, a pre-convergence phase signal 80 is output, and a corresponding post-convergence phase signal 82 is output once the convergence time has been reached. The range of confidence (ROC) is determined on the basis of previous estimated values from previous processing cycles of the TMA method 26, for example from the standard deviation of the target range. This describes the stability of the TMA solution 28.

At the start of a track, a high ROC value indicates that the TMA solution 28 is still unstable, and that the optimization method 26 is in the pre-convergence phase.

Since the sonar installation operator often has additional information about the target, he can frequently use this additional information to assess whether the limit values 10 which have been identified as being incorrect are also actually incorrect, when the CTMA solution 12 is on the edge of the solution space covered by the limit values 10. Therefore, the CTMA solution 12 and/or the temporary target data R, K, V which has been determined from the CTMA solution 12 are/is output together with the limit values 10 to the operator for the duration of the pre-convergence phase signal 80. The output 24 is advantageously in a suitably preprocessed graphic form, thus allowing the operator to identify incorrect limit values 10 even in the pre-convergence phase. In this situation, the operator changes the limit values 10 manually, and carries out the method again.

After reaching the convergence time, the convergence phase detector 78 changes to the post-convergence phase, and outputs a corresponding post-convergence phase signal 82, which starts the error handling process 14 according to the exemplary embodiment shown in FIG. 2.

All of the features mentioned in the above description and in the claims can be used both individually and in any desired combination with one another, according to the invention.

The invention is therefore not restricted to the described and/or claimed feature combinations. In fact, all combinations of individual features may be considered to have been disclosed.

What is claimed is:

1. A method for passive determination of target data associated with a target, said target data comprising a target range (R), a target course (K) and/or a target velocity (V), said method comprising:

providing predetermined limit values (10) for target data that are to be determined, measuring bearing angles (4) to the target by means of an arrangement of water-borne sound sensors of a sonar receiving installation (2) by directionally selective reception of sound waves emitted or sent from the target, estimating bearing angles determined from estimated positions of the target, minimizing bearing angle differences from the measured bearing angles (4) and the estimated bearing angles by iteratively minimizing the bearing angle differences over a plurality of processing cycles by means of at least one optimization method (6) comprising a CTMA method, wherein an estimated position of the target is determined as an optimized CTMA solution (12), from temporary target data, said at least one optimization method (6) taking account the predetermined limit values (10) for the target data to be determined, during the optimization, carrying out an error handling process (14) for identification and correction of incorrect limit values (10), said error handling process (14) including the following steps:

a) limit values (10) are checked for possible errors by means of a plausibility test module (38) carrying out a plausibility test for identification of incorrect limit values (10), and b) i) if at least one incorrect limit value (10) is identified, one, a plurality, or all of the limit values (10) are changed using predetermined rules by means of a correction module (40) to obtain corrected limit values (20), and repeating the CTMA optimization method (6) and the error handling process (14) again, taking account of the changed limit values (20) for determination of new temporary target data, and ii) if no incorrect limit value (10) is identified, the optimized CTMA solution (12) from the optimization method (6) is output, and/or the target data which has been determined from the optimized CTMA solution (12) and is assumed to be correct is output, wherein said method includes using at least one computer.

2. A method according to claim 1, wherein the method further comprises the following steps:

a) carrying out a further optimization method (26) comprising a TMA optimization method for determining further temporary target data comprised of $R_{TMA}$, $K_{TMA}$, and/or $V_{TMA}$ from an optimized TMA solution (28) of the TMA optimization method (26), with the estimated position of the target being determined as the optimized TMA solution (28), b) comparing this temporary target data ($R_{TMA}$, $K_{TMA}$, $V_{TMA}$) with the limit values (10) in order to check whether the temporary target data ($R_{TMA}$, $K_{TMA}$, $V_{TMA}$) is within a solution space which is covered by the limit values (10), and c) i) if no temporary target data item ($R_{TMA}$; $K_{TMA}$; $V_{TMA}$) is identified outside the solution space, the optimized TMA solution (28) is output, and/or the target data which has been determined from the optimized TMA solution (28) and is assumed to be correct is output, and ii) if at least one temporary target data item ($R_{TMA}$; $K_{TMA}$; $V_{TMA}$) is identified outside the solution space, the optimization method (6) is started and the error handling process (14) for identification and correction of incorrect limit values (10) is carried out.

3. A method according to claim 2, wherein said method further comprises determining a convergence time of the TMA optimization method (26), with the optimized CTMA solution (12) from the optimization method (6) being output for the situation in which the optimization method (6) is carried out until the convergence time is reached, and/or the target data (R, K, V) which was determined from the optimized CTMA solution (12) and is assumed to be correct is output without previously carrying out the error handling process (14), and after reaching the convergence time of the TMA optimization method (26), carrying out the error handling process (14) for identification and correction of incorrect limit values (10).

4. A method according to claim 3, wherein the optimized CTMA solution (12) from the optimization method (6) and/or the target data (R, K, V) which has been determined from the optimized CTMA solution (12) and is assumed to be correct are/is output visually until the convergence time is reached, and the limit values (10) are changed by means of an input device (8).

5. A method according to claim 1, wherein said plausibility test (38) comprises carrying out a residue test (42) and/or an edge test (44).

6. A method according to claim 1, wherein correcting the incorrect limit values (10) by means of the correction module (40) comprises:

a) when either at least one incorrect limit value (10) or an incorrect, changed limit value (20) is identified, one, a plurality or all of the limit values (10; 20) and/or an associated limit value interval which has the limit value (10; 20) are/is changed, and the optimization method (6) and the error handling process (14) are carried out once again in the current processing cycle, taking account of the changed limit values, b) when at least one incorrect, changed limit value (20) is identified again, step a) is repeated in the current processing cycle, c) when at least one incorrect, changed limit value (20) is identified again, and after step a) has been carried out a plurality of times, the optimization method (6) and the error handling process (14) are carried out again in the current processing cycle, taking account of predetermined minimum limit values, or the optimization method (6) and the error handling process (14) are carried out again in the next processing cycle, with bearing angles (4) being measured again, and taking account of predetermined limit values (10).

7. A method according to claim 1, wherein said method further comprises accounting for a target maneuver that occurs while carrying out the optimization method (6), which the optimization method (6) takes into account by calculating an original target leg with the original limit values (10) being taken into account for the original target leg, and calculating a new target leg with new limit values being defined for the new target leg reflecting the maneuvered target.

8. Apparatus for passive determination of target data associated with a target said target data comprising a target range (R), a target course (K) and/or a target velocity (V), from bearing angles (4), which can be measured by means of an arrangement of water-borne sound sensors of a sonar receiving installation (2) by directionally selective reception of sound waves emitted or sent from the target, and from estimatable bearing angles, which can be determined from estimated positions of the target, said apparatus having means for iteratively minimizing bearing angle differences from the measured bearing angles (4) and the estimated bearing angles over a plurality of processing cycles by means of at least one optimization method (6) comprising a CTMA method, and with an estimated position of the target, determined as an optimized CTMA solution (12), from the temporary target data, and with the optimization method (6) taking into account predetermined limit values (10) for the target data to be determined, during the optimization, an error handling device (14) designed to identify and to correct incorrect limit values (10), said error handling device (14) having a plausibility test module (38) and a correction module (40), said plausibility test module (38) designed to identify incorrect limit values (10), said correction module (40) designed to correct incorrect limit values (10), and an output unit (24) for outputting the optimized CTMA solution (12) from the optimization method (6) and/or for outputting target data which can be determined from the optimized CTMA solution (12) and is assumed to be correct, for the situation in which no incorrect limit values (10) can be identified by means of the plausibility test module (38).

9. The apparatus according to claim 8, wherein said means comprises a computer.

10. Apparatus according to claim 8, wherein the plausibility test module (38) has a residue test module (42) and/or an edge test module (44), and said residue test module (42) and said edge test module (44) designed to identify incorrect limit values.

11. Apparatus according to claim 8, wherein said apparatus includes a test device (30) to test whether temporary target data ($R_{TMA}$, $K_{TMA}$, $V_{TMA}$) which can be determined from an optimized solution (28) of a TMA optimization method (26), is within a solution space which can be covered by the limit values (10), in which case the estimated position of the target on which the minimum which can be determined by the TMA method (26) is based can be determined as the optimized TMA solution (28).

12. Apparatus according to claim 11, wherein said apparatus includes a convergence phase detector (78) to determine a convergence time of the TMA optimization method (26).

13. Apparatus according to claim 8, wherein said apparatus is adapted to carry out one, a plurality of, or all of the method steps according to claim 1.

14. A method selected from the group consisting of:

(a) a method for passive determination of target data associated with a target, said target data comprising a target range (R), a target course (K) and/or a target velocity (V), said method comprising:

providing predetermined limit values (10) for target data that are to be determined, measuring from bearing angles (4) to the target, which are measured by means of an arrangement of water-borne sound sensors of a sonar receiving installation (2) by directionally selective reception of sound waves emitted or sent from the target, and from estimated estimating bearing angles determined from estimated positions of the target, minimizing bearing angle differences from the measured bearing angles (4) and the estimated bearing angles by iteratively minimizing the bearing angle differences over a plurality of processing cycles by means of at least one optimization method (6) comprising a CTMA method, wherein an estimated position of the target is determined as an optimized CTMA solution (12), from temporary target data, said at least one optimization method (6) taking account of the predetermined limit values (10) for the target data to be determined, during the optimization, carrying out an error handling process (14) for identification and correction of incorrect limit values (10), said error handling process (14) including the following steps:

a) limit values (10) are checked for possible errors by means of a plausibility test module (38) carrying out a plausibility test for identification of incorrect limit values (10), and b) i) if at least one incorrect limit value (10) is identified, one, a plurality, or all of the limit values (10) are changed using predetermined rules by means of a correction module (40) to obtain corrected limit values (20), and repeating the optimization method (6) and the error handling process (14) step (a) again, taking account of the changed limit values (20) for determination of new temporary target data, and ii) if no incorrect limit value (10) is identified, the optimized CTMA solution (12) from the optimization method (6) is output, and/or the target data which has been determined from the optimized CTMA solution (12) and is assumed to be correct is output, a residue test (42) and/or an edge test (44) are/is carried out for the plausibility test (38) for identification of incorrect limit values (10), and determining a residue factor (Q) for the residue test (42), said residue factor (Q) being determined from the respective solutions of the optimization methods using at least two different optimization methods that respectively comprise a TMA method (26) and a CTMA method (6), said residue factor (Q) being compared with at least one predetermined threshold value for identification of incorrect limit values (10);

wherein said method includes using at least one computer, and (b) a method for passive determination of target data associated with a target, said target data comprising a target range (R), a target course (K) and/or a target velocity (V), said method comprising:

providing predetermined limit values (10) for target data that are to be determined, measuring from bearing angles (4) to the target, which are measured by means of an arrangement of water-borne sound sensors of a sonar receiving installation (2) by directionally selective reception of sound waves emitted or sent from the target, and from estimated estimating bearing angles determined from estimated positions of the target, minimizing bearing angle differences from the measured bearing angles (4) and the estimated bearing angles by iteratively minimizing the bearing angle differences over a plurality of processing cycles by means of at least one optimization method (6) comprising a CTMA method, wherein an estimated position of the target is determined as an optimized CTMA solution (12), from temporary target data, said at least one optimization method (6) taking account of the predetermined limit values (10) for the target data to be determined, during the optimization, carrying out an error handling process (14) for identification and correction of incorrect limit values (10), said error handling process (14) including the following steps:

a) limit values (10) are checked for possible errors by means of a plausibility test module (38) carrying out a plausibility test for identification of incorrect limit values (10), and b) i) if at least one incorrect limit value (10) is identified, one, a plurality, or all of the limit values (10) are changed using predetermined rules by means of a correction module (40) to obtain corrected limit values (20), and repeating the optimization method (6) and the error handling process (14) step (a) again, taking account of the changed limit values (20) for determination of new temporary target data, and ii) if no incorrect limit value (10) is identified, the optimized CTMA solution (12) from the optimization method (6) is output, and/or the target data which has been determined from the optimized CTMA solution (12) and is assumed to be correct is output, wherein said plausibility test comprises carrying out a residue test (42) and/or an edge test (44) for identification of incorrect limit values (10), and for the edge test (44) for identification of incorrect limit values (10), the limit values (10) and/or a variable which is derived from the limit values (10), in particular state restrictions, are/is compared with the optimized CTMA solution (12) from the optimization method (6), and/or the temporary target data which has been obtained from the optimized CTMA solution (12), wherein said method includes using at least one computer.

15. The method according to claim 14, wherein said method is the (a) method.

16. The method according to claim 14, wherein said method is the (b) method.

* * * * *